United States Patent

[11] 3,578,139

| [72] | Inventor | Ronald A. Pearce<br>Jefferson City, Colo. |
|---|---|---|
| [21] | Appl. No. | 856,091 |
| [22] | Filed | Sept. 8, 1969 |
| [45] | Patented | May 11, 1971 |
| [73] | Assignee | Coors Porcelain Company<br>Golden, Colo. |

[54] ARTICLE HANDLING MACHINE UNLOADING MECHANISM
13 Claims, 5 Drawing Figs.

[52] U.S. Cl. ................................................. 198/28
[51] Int. Cl. ................................................. B65g 47/74
[50] Field of Search ........................................ 198/27, 28, 51, 25, 103

[56] References Cited
UNITED STATES PATENTS
2,351,801   6/1944   Baumann ..................... 198/28

Primary Examiner—Edward A. Sroka
Attorney—Bertha L. MacGregor

ABSTRACT: Article handling and unloading mechanism comprising a traveling endless belt having an article supporting surface on which articles are carried to an unloading position, a rotating roller having means thereon for engaging the belt and extending through openings in the belt to project beyond the article carrying surface and to constitute lifting surfaces for lifting articles from the supporting surface when the belt approaches unloading position and transfer them to an article receiving curved plate which is pivotally mounted adjacent the unloading position of the belt for automatically assuming an article receiving position overlying the unloading area of the belt.

INVENTOR.
Ronald A. Pearce
BY Bertha L. MacGregor
ATTORNEY

INVENTOR.
Ronald A. Pearce

BY Bertha L. MacGregor
ATTORNEY

INVENTOR.
Ronald A. Pearce
BY
Bertha L. MacGregor
ATTORNEY

ARTICLE HANDLING MACHINE UNLOADING MECHANISM

This invention relates to article handling and unloading mechanism, and more particularly to mechanism in article handling machines for unloading articles from a mesh belt which is part of the machine and on which articles are conveyed to a receiving bin or conveyor for subsequently operations. The invention may be embodied in a large variety of article handling machines but is shown and described herein as embodied in a container washing and drying machine wherein open top containers, such as cans, for example, are supported and carried in inverted vertical positions on an endless traveling belt which conveys the cans through the washing machine while being subjected to the washing and drying operations, and then unloads the washed and dried cans from the belt to slide downwardly by gravity on their open ends over a transversely curved plate known in the trade as a "waterfall" which guides the containers into a receiving bin or to a conveyor in axially horizontal positions.

Preferably the endless belts used in machines for washing cans are made of flat wire strips which are bent and connected to form a link mesh support for the cans. The belt must be made of acid-resistant metal and be of sufficient depth or thickness to provide required support for containers or other articles which may be carried on a belt 6 ft. wide and 112 ft. long, for example, such as is used in can washing and drying machines. Further, the belt must be provided with openings large enough to permit acid or cleansing solutions to pass through the belt into the open ends of the containers on the belt.

The endless belt for this purpose is trained over toothed rollers which may be driven rollers or idlers. Difficulties have been encountered heretofore in the unloading of articles from the flat wire mesh belts in use due to the fact that angles or "corners" project outwardly beyond the upper surface of the traveling belt when the belt is flexed in its passage in a downwardly curved path while engaged by the teeth of the roller near the unloading end of the structure. The projecting parts of the belt links of a transverse strip extend across the entire width of the belt in the area between the horizontally disposed links and the first row of angularly downwardly inclined links in the flexed belt. These projections injure the open end edges of the very thin walls of aluminum cans carried by the belt, and also interfere with the tipping and sliding of the cans into desired positions to pass over the waterfall into a receiving bin.

The object of this invention is to overcome the aforementioned difficulties and to ensure uninterrupted passage of the cans or other articles from the belt to the waterfall over which they fall to the receiving bin in predetermined positions, that is, axially horizontal positions, in horizontal rows, with the open ends of the cans near the waterfall. This object has been achieved by me by providing means in the roller for lifting the cans slightly while they are carried by the belt as the belt moves from its straight horizontal plane into the downwardly curved path defined by the rotating roller engaging the belt.

Another object of the invention is to provide means for pivotally mounting the waterfall so that its article receiving edge automatically assumes the optimum position relatively to the belt and roller for receiving articles being unloaded from the belt.

Figure 1:
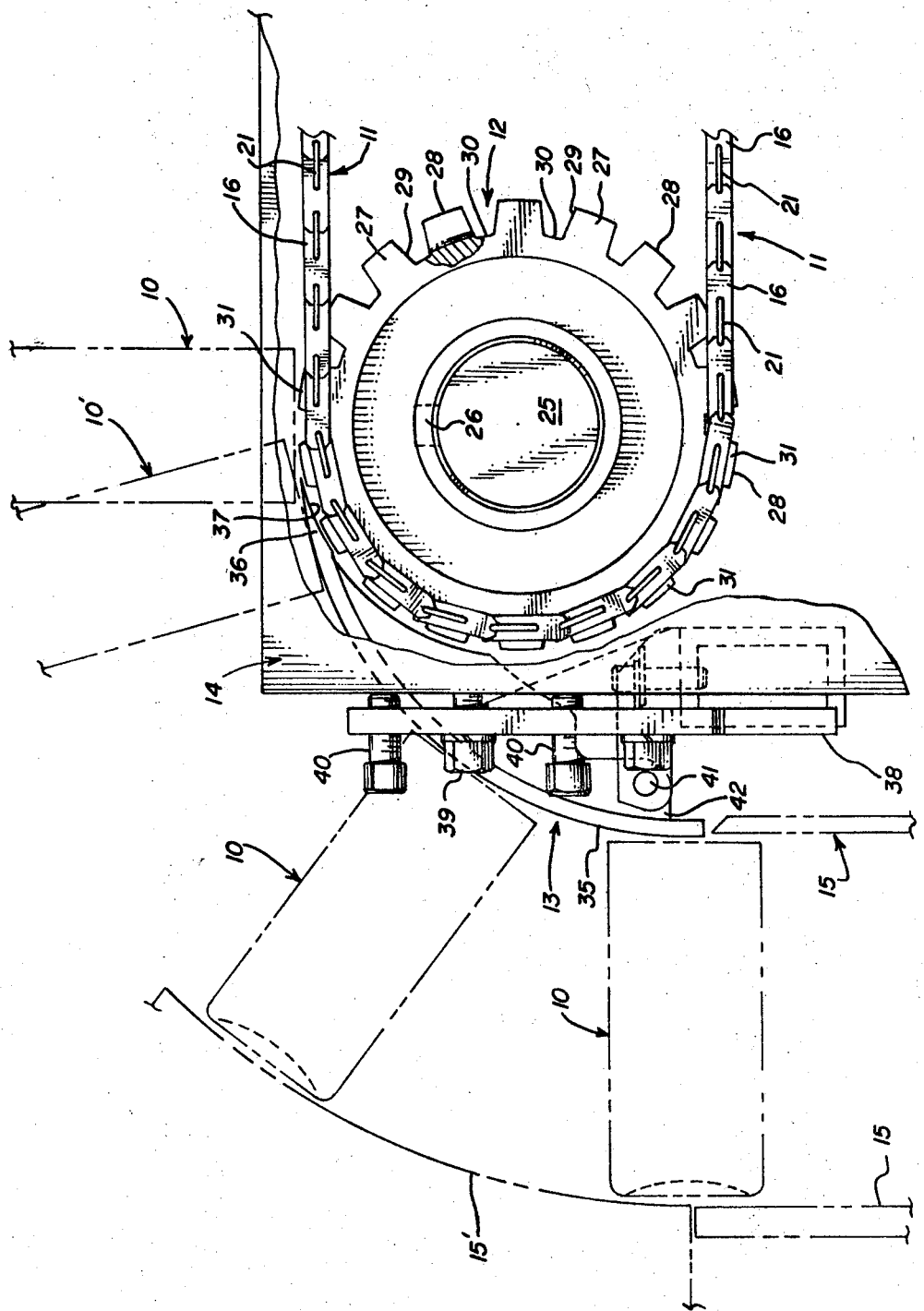
FIG. 1 is an elevational side view of can unloading mechanism, showing the end of the toothed roller embodying my invention, a side elevational view of a flat wire mesh belt, partly broken away, a waterfall and its mounting plate, and cans, in broken lines, moving from the belt over the waterfall into a receptacle.
Figure 2:
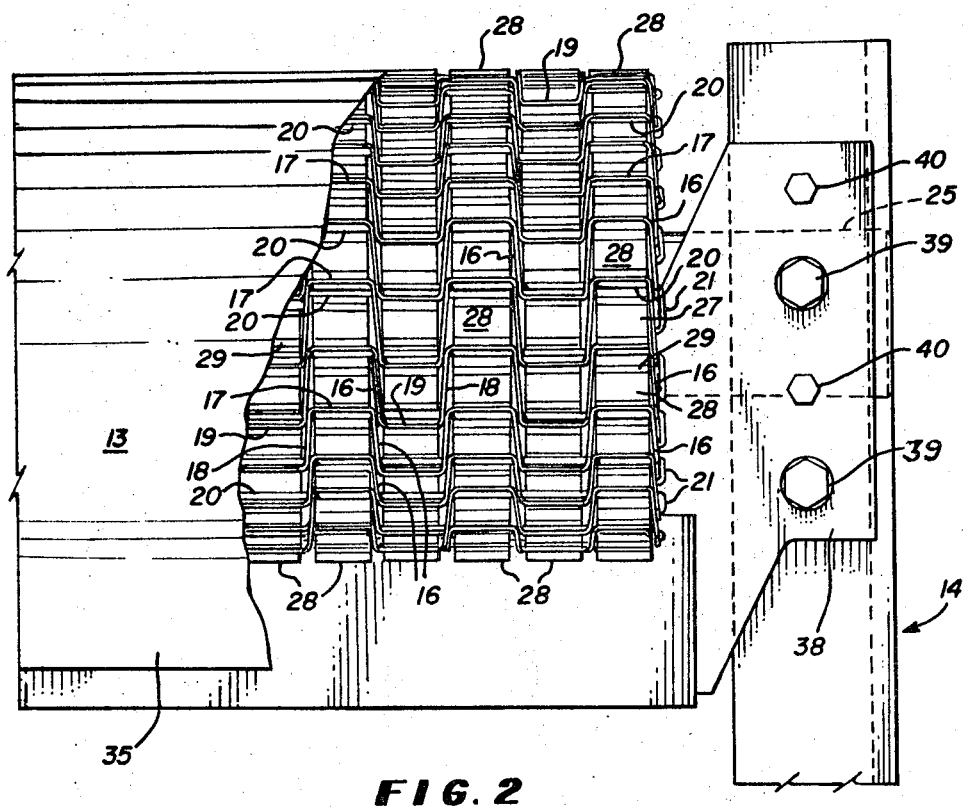
FIG. 2 is an elevational front view of the waterfall, broken away, the waterfall mounting means, and part of a flat wire mesh belt on the toothed roller, as viewed from the left hand side of FIG. 1.

In the embodiment of the invention shown in the drawings, cans 10 are shown in inverted positions, open top down, one can being shown as moving from the horizontal top surface of the flat wire mesh belt 11 toward the waterfall 13, and into the position of can 10' as it moves onto the waterfall over the flexed part of the moving belt 11 engaged by the toothed roller 12. The waterfall 13 is a transversely curved member supported by a mounting plate 14 adjacent the roller 12. Cans fall into axially horizontal position in a receptacle 15 beneath the guide 15'.

Figure 3:
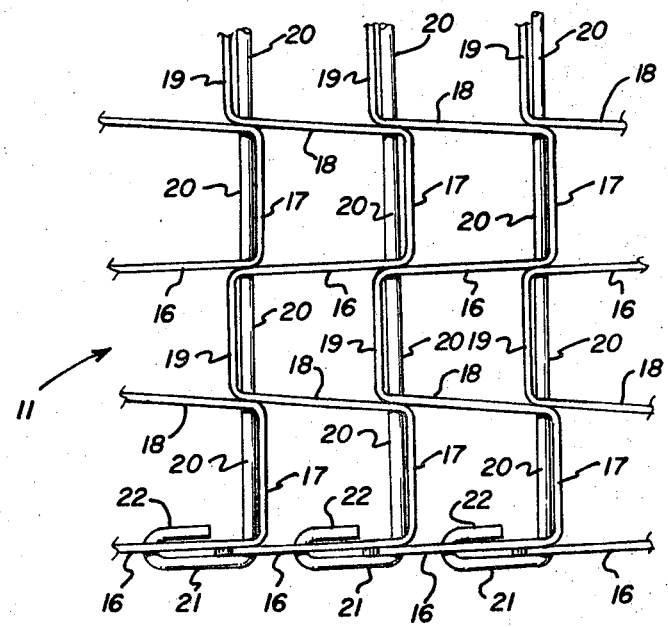
FIG. 3 is a plan view of a part of a flat wire mesh belt, on a larger scale than the belt shown in FIGS. 1 and 2.
Figures 4, 5:
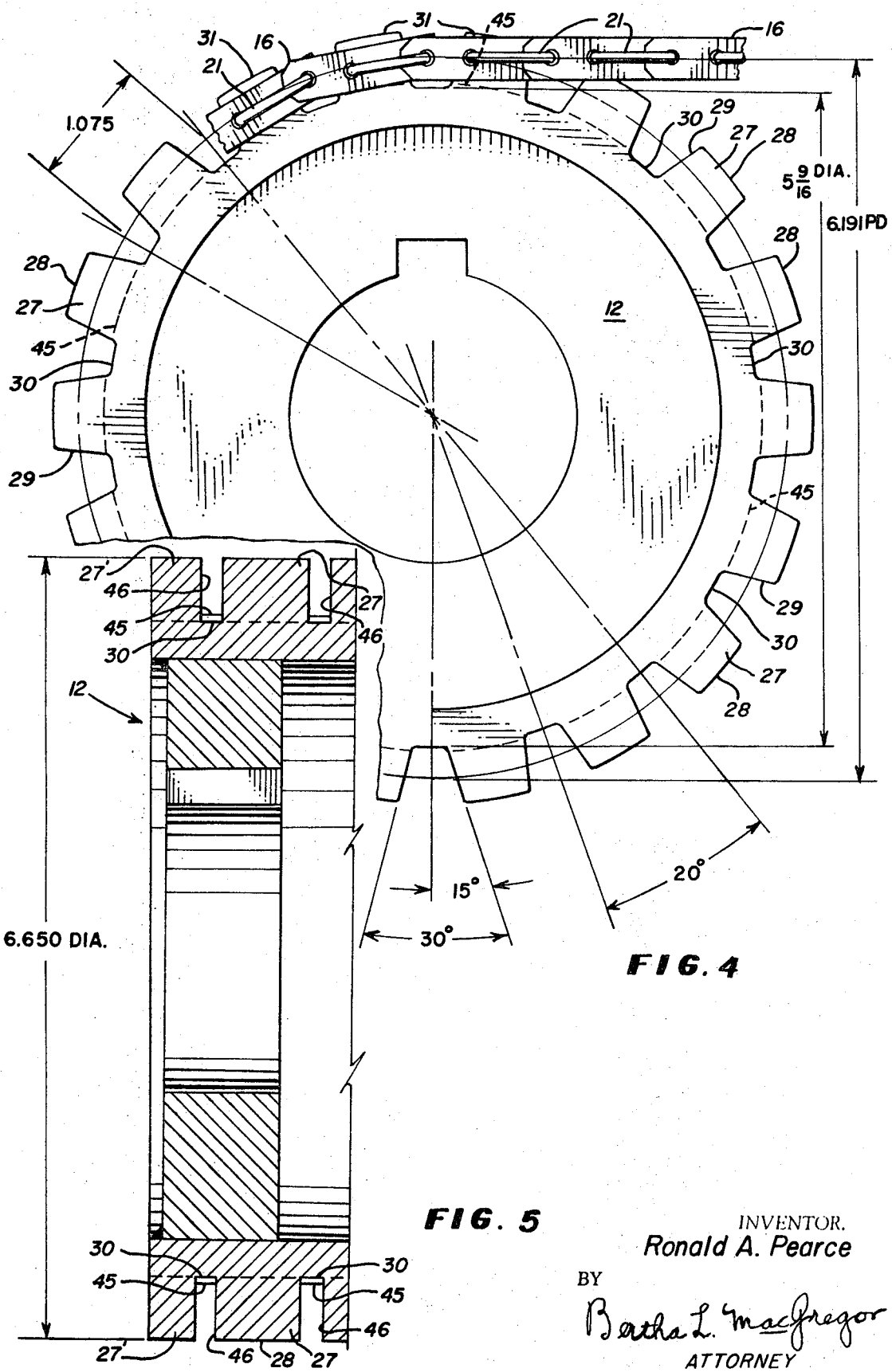
FIG. 4 is an elevational view, partly broken away, of the toothed roller, on a scale larger than shown in FIGS. 1 and 2, including a portion of the flat wire mesh belt.
FIG. 5 is a longitudinal vertical sectional view of a portion of the roller, adjacent one end thereof.

The belt 11 is made of flat wire strips which extend across the belt 11, each strip being bent to form link portions 16, 17, 18, 19, repeatedly, as shown in FIG. 3, so the several portions 16 and 18 extend approximately longitudinally of the belt and the several portions 17 and 19 extend transversely of the belt. The links of one strip are partially nested in links of an adjacent strip and the parts 16 and 18 are apertured to receive the transversely extending straight rods 20. Rods 20 have end portions 21 and terminals 22 extending through a wire member 16 at each longitudinal edge of the belt, and crimped to hold the parts in assembled relationship. The roller 12 is mounted on a shaft 25 to which it is keyed at 26. The roller 12 is provided with equispaced teeth 27 each having arcuately shaped outer surfaces 28 and inclined side surfaces 29 when viewed from the ends of the roller 12, as shown in FIGS. 4 and 5. The roller 12, as shown in FIGS. 4 and 5, is full size of one example of roller and teeth, the diametrical dimensions and tooth surface angles being noted in said views. The peripheral surface of the roller between the teeth 27 is designated 30. The relationship between the roller, teeth and belt is such that when the belt is engaged by the teeth 27, the outer end portions 31 and top surfaces 28 of the teeth project outwardly beyond the upper surface of the belt 11 as shown in FIGS. 1 and 4. In the example shown, the belt is a 1×1×⅜inch flat wire mesh, and the roller teeth are deeper than the three-eighths inch depth of the flat wire, usually a half inch, so that the teeth project one-eighth inch beyond the outer surface of the belt engaged by the teeth. The angles of the side surfaces 29 of the teeth, and the size of the belt openings are such that the teeth enter the openings without binding and permit flexing of the belt over the roller.

The waterfall 13 is a curved plate having a smooth outer surface 35. The upper end area 36 is gradually reduced in thickness to provide an arcuate lower surface 37. The plate 13 is mounted on an angle plate 38 connected to the mounting plate 14 by which the waterfall is located in the position shown in FIG. 1, with the surface 37 of the thinned end 36 closely adjacent the arcuate top surface 28 of the protruding part 31 of the teeth 27 as they move toward the waterfall. The waterfall plate 13 is pivotally connected to plate 38 by pivot 41 and bracket 42, and the plate 38 is adjustably connected to the plate 14 by any suitable means 39, 40. The adjusting means and pivotal connection provide means for automatically placing the waterfall in the exact desired position relatively to the belt 11 and roller teeth 27 to ensure smooth passing of the cans 10 from the surface 28 of the teeth 27 when the cans approach the area where the straight horizontal portion of the belt moves into the arcuate path where the links are downwardly inclined.

In FIGS. 4 and 5, the line 45 indicates the position of the lower edge of the flat wire links of the belt 11. The inclined surfaces 29 of the teeth and the relative dimensions of the belt links and roller teeth permit entry of the teeth into the spaces the inturned portions of the strips which form the belt. As is apparent from FIG. 3, these spaces are defined by wire portions 16 and 18 of one strip, 17 of an adjacent strip, and rod which passes through the two strips. The side surfaces 46 of the teeth between the inclined surfaces 29 may be parallel with each other as shown in FIG. 5. The end tooth, 27′, is narrower due to the fact that some of the space adjacent the side edge of the belt is occupied by the inturned ends 22 of rods 20.

Obviously the size of the teeth 27 and the height of their sides 29 vary according to the depth of the links forming the belt 11. For purposes of this invention it is essential that the teeth 27 be deeper than the width of the major surfaces of the flat wire strips which form the links of the belt 11 in order to produce the outer ends 31 of the teeth protruding beyond the belt, thereby providing article supporting and lifting surfaces 28 on the teeth for engaging the can ends and transferring the cans 10 or other articles from the horizontal top of the belt 11 to the waterfall edge area 36. Thus, temporarily, the outer surfaces 28 of the teeth 27 become the supports for the cans 10 and prevent contact between the can ends and the link members 17, 19, as they pivot around the rods 20 in assuming the flexed condition of the belt 11 where it is engaged by the toothed roller. Most commonly the teeth 27 will vary in depth from one-half to three-fourths inch depending on the depth of the belt which is determined by the width of the major surfaces of the flat wire strips forming the belt. The cross sectional dimensions of the teeth 27 vary according to the sizes of the openings in the mesh belt 11, and the angles shown in the example of FIG. 4 are selected to ensure proper engagement between teeth 27 and belt 11 and freedom from binding between belt and teeth when the belt is flexed around the roller as shown in FIG. 1.

I claim:

1. An article handling and unloading mechanism comprising:
   a. a traveling endless belt having an article supporting surface on which articles are carried to an unloading position, said belt being provided with openings extending through the belt,
   b. a rotating roller extending axially transversely of the belt,
   c. means on the roller engaging the belt and extending through the openings and projecting beyond the article supporting surface of the belt when in engagement with the belt, said means supporting and lifting the articles from the supporting surface of the belt when the belt approaches unloading position, and
   d. article receiving means adjacent the belt and roller for receiving the articles from the article lifting means on the roller as the belt passes unloading position.

2. The mechanism defined by claim 1, in which the belt engaging and article lifting means on the roller comprise a series of radially extending spaced-apart teeth on the roller arranged in rows extending axially and circumferentially of the roller, said teeth having outer arcuate surfaces concentric with the peripheral surface of the roller.

3. The mechanism defined by claim 2, in which the depth of the teeth between their arcuate outer surfaces and the peripheral surface of the roller is greater than the thickness of the belt.

4. The mechanism defined by claim 3, in which the teeth have beveled surfaces on the sides which are parallel to the axis of the roller for nonbinding engagement with the belt when the teeth enter the belt openings and the belt is moved through its unloading position.

5. The mechanism defined by claim 1, in which the belt is a flat wire mesh belt made of strips of flat wire, each strip being bent to form links and the links of adjacent strips being partially nested and pivotally connected together by rods extending transversely of the belt, the outer surfaces of said links providing an article carrying surface in a substantially horizontal plane from which the links project angularly when the belt approaches unloading position, and in which the means on the roller which project beyond the article supporting surface of the belt extend outwardly beyond said angularly projecting links of the belt into article supporting and lifting positions to prevent contact between the articles and said angularly projecting links of the belt as the belt passes unloading position.

6. The mechanism defined by claim 1, in which the article receiving means adjacent the belt and roller comprises a waterfall which is a curved plate adjacent the unloading position of the belt having an article receiving edge area of gradually reduced thickness closely overlying the article supporting surface of the belt, said plate being pivotally mounted on a support to automatically rest in article receiving position adjacent the belt.

7. An article handling and unloading mechanism comprising:
   a. a traveling endless belt having an article supporting surface on which open top cans are carried in axially vertical inverted positions to an unloading position, said belt being provided with openings extending through the belt smaller in diameter than the diameter of the cans,
   b. a rotating roller extending axially transversely of the belt,
   c. means on the roller engaging the belt and extending through the openings and projecting beyond the can supporting surface of the belt when in engagement with the belt, said means supporting and lifting the cans from the supporting surface of the belt as the belt approaches unloading position to thereby space the open end edges of the can from the belt,
   d. can transferring means adjacent the belt and roller for receiving the cans from the lifting means on the roller as the belt passes unloading position, and
   e. guiding means for guiding the cans into horizontally disposed positions into receiving means.

8. The mechanism defined by claim 7, in which the belt is a flat wire mesh belt made of strips of flat wire, each strip being bent to form links and the links of adjacent strips being partially nested and pivotally connected together by rods extending transversely of the belt, the outer surfaces of said links providing a can carrying surface in a substantially horizontal plane from which the links project angularly when the belt approaches unloading position, and in which the means on the roller which project beyond the can supporting surface of the belt extend outwardly beyond said angularly projecting links of the belt into can supporting and lifting positions to prevent contact between the can open end edges and said angularly projecting links of the belt as the belt passes unloading position.

9. The mechanism defined by claim 7, in which the belt engaging and can lifting means on the roller comprise a series of radially extending spaced apart teeth on the roller arranged in rows extending axially and circumferentially of the roller, said teeth having outer arcuate surfaces concentric with the peripheral surface of the roller.

10. The mechanism defined by claim 9, in which the depth of the teeth between their arcuate outer surfaces and the peripheral surface of the roller is greater than the thickness of the belt.

11. The mechanism defined by claim 10, in which the teeth have beveled surfaces on the sides which are parallel to the axis of the roller for nonbinding engagement with the belt when the teeth enter the belt surfaces and the belt is moved through its unloading position.

12. The mechanism defined by claim 7, in which the can receiving means adjacent the belt and roller comprises a waterfall which is a curved plate adjacent the unloading position of the belt and having a can receiving edge area of gradually reduced thickness closely overlying the can supporting surface of the belt, said plate being pivotally mounted on a support to automatically rest in can receiving position adjacent the belt.

13. An article handling and unloading mechanism comprising:
   a. a traveling endless belt having an article supporting surface on which articles are carried to an unloading position,
   b. a rotating roller extending axially transversely of the belt,
   c. means on the roller engaging the belt for moving the belt, d. a waterfall which is a curved plate adjacent the unloading position of the belt and having an article receiving edge area of gradually reduced thickness having an arcuate under surface closely overlying the article supporting surface of the belt,
e. a support adjacent the belt,
f. a mounting plate for the curved waterfall plate,
g. means adjustably mounting the mounting plate on the support, and
h. means pivotally connecting the waterfall to the mounting plate for permitting the waterfall to automatically rest in article receiving position overlying the article supporting surface of the belt.